(12) United States Patent
Ebden et al.

(10) Patent No.: US 6,224,321 B1
(45) Date of Patent: May 1, 2001

(54) IMPELLER CONTAINMENT SYSTEM

(75) Inventors: Clive Ebden, Mill Creek, WA (US); Reha Gomuc, Phoenix, AZ (US)

(73) Assignee: Pratt & Whitney Canada Inc., Quebec (CA)

( * ) Notice: Subject to any disclaimer, the term of this patent is extended or adjusted under 35 U.S.C. 154(b) by 0 days.

(21) Appl. No.: 09/206,229

(22) Filed: Dec. 7, 1998

(51) Int. Cl.$^7$ .................................................. F01D 21/04
(52) U.S. Cl. ......................... 415/9; 415/174.4; 415/224.5
(58) Field of Search .................. 415/9, 170.1, 174.4, 415/173.4, 173.1, 173.5, 173.6, 200, 208.3, 208.4, 224.5

(56) References Cited

U.S. PATENT DOCUMENTS

| | | |
|---|---|---|
| 3,613,360 | 10/1971 | Howes . |
| 3,652,176 | * 3/1972 | Walsh ........................................ 415/9 |
| 4,264,271 | 4/1981 | Libertini . |
| 4,687,412 | 8/1987 | Chamberlain . |
| 5,427,498 | 6/1995 | Lehe et al. . |
| 5,601,406 | * 2/1997 | Chan et al. .......................... 415/206 |
| 5,618,162 | 4/1997 | Chan et al. . |

FOREIGN PATENT DOCUMENTS

| | | |
|---|---|---|
| 676737 | 2/1991 | (CH) . |
| 0 834 646 | 4/1998 | (EP) . |

OTHER PUBLICATIONS

PCT International Search Report, Mar. 13, 2000, European Patent Office.

* cited by examiner

Primary Examiner—Edward K. Look
Assistant Examiner—Liam McDowell

(57) ABSTRACT

The present invention relates to an impeller containment system for containing the burst of an impeller or the burst of impeller fragments from an impeller hub. The containment system utilizes a catcher extending from a shroud plate adjacent the impeller, which engages with a snagger formed as a unitary part of the impeller. The catcher and snagger cooperate to restrain a burst impeller or impeller fragments to their shortest radial distance from their point of burst. The system also includes a shroud which circumferentially surrounds the impeller and a diffuser, which circumferentially surrounds the radial tip portions of the impeller.

10 Claims, 2 Drawing Sheets

IMPELLER CONTAINMENT SYSTEM

BACKGROUND OF THE INVENTION

1. Field of the Invention

Figure 1:
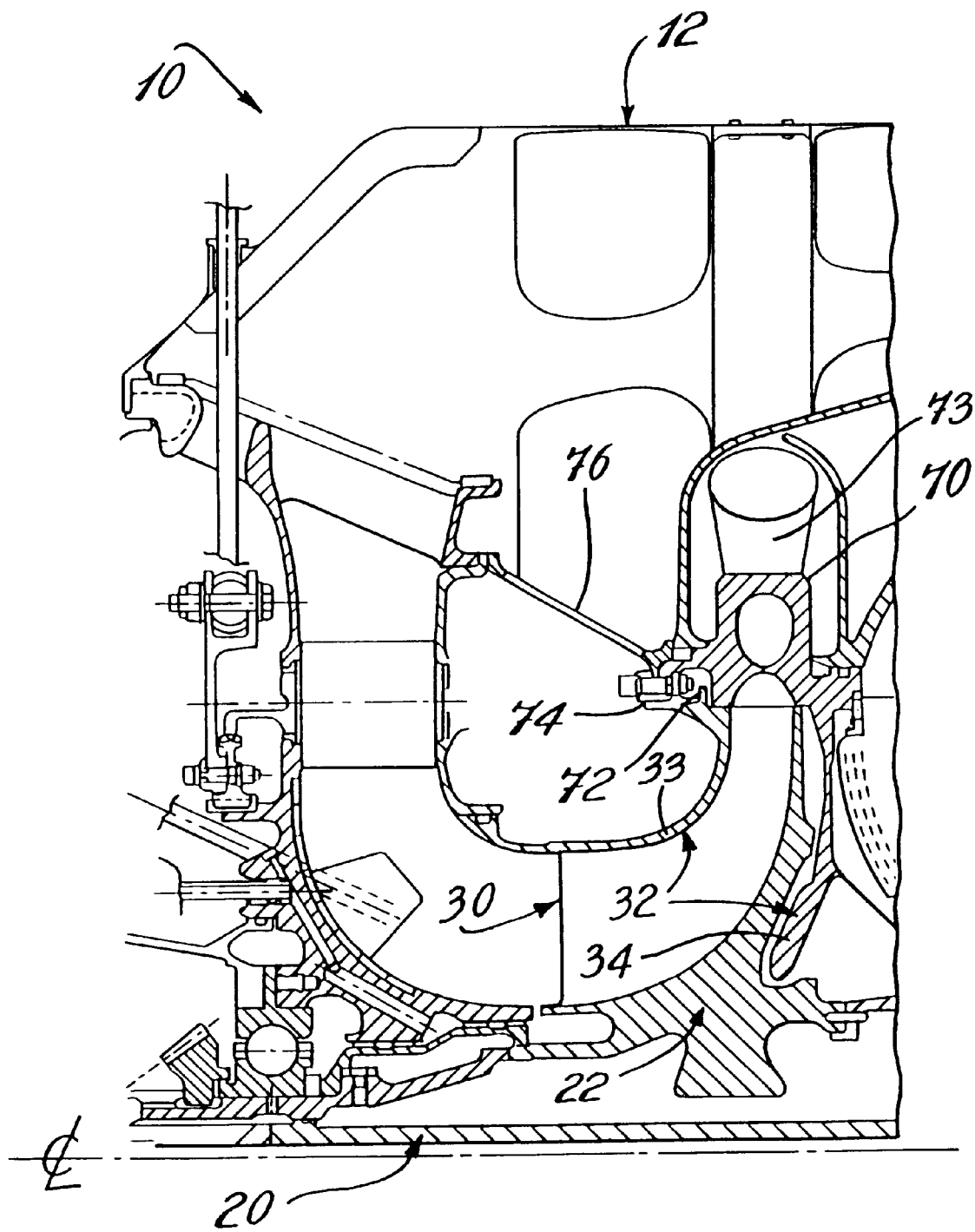

The present invention relates to a containment system for containing a burst impeller or impeller fragments and, in particular, an impeller containment system that utilizes a cooperating snagger and catcher to contain the tangential movement of a burst impeller or impeller fragments.

2. Description of the Prior Art

Aircraft engines and auxiliary power units are known to include turbines and compressors which rotate about a central shaft at high rotational speeds. Although modern gas turbine engines and auxiliary power units can perform for thousands of hours without any significant malfunction, circumstances have arisen where turbine blades or impeller blades can burst from their rotational hub. In general, when such a burst occurs, it is most desirable to contain such hub fragments of the burst disk within the shortest possible radius. In this way, the material cross-section required to provide the necessary shear and hoop strength to contain the burst can be minimized to reduce weight, while still maintaining a sufficient factor of safety for protection of the engine and aircraft systems and structure.

It is also desirable to contain the burst within the shortest axial distance as can be obtained, so that the range of trajectories of burst fragments resulting from a burst will be minimal. In practice within the prior art, impeller hub fragments have been contained by using impeller shrouds, diffusers, and the outer engine cases as the primary containment structures. However, the conventional prior art impeller shrouds and diffusers have sometimes failed to contain the hub burst over sufficiently small axial and radial distances. In the conventional prior art, these containment structures have tended to be remote from the respective origin of burst. Consequently, in order to span the anticipated range of trajectories of burst fragments, these containment structures have been axially long and radially thick such that their cross-sections have been massive relative to adjacent normal engine structure. Tests have shown that these structures can be inefficient with respect to their weight.

An undesirable feature of these structures is that the burst fragments are generally unrestrained until they have reached the outer structure of the engine, by which time the fragments can be unfavourably oriented for efficient containment having been deflected from the original plane of rotation, both by intermediate structure and by the mode of break-up of the disk since each failure event can be different.

SUMMARY OF THE INVENTION

It is, therefore, an object of the present invention to provide a containment structure which contains burst hub fragments within the shortest possible radius and the shortest possible axial distance from the point of burst.

It is another object of the present invention to provide an impeller containment system which protects engine components from tri-hub burst, as will be explained, but which is designed to minimize added material and thus added weight to an engine.

It is a further object of the present invention to provide an impeller containment system in which the impeller itself forms part of the containment system, so as to minimize the travel of impeller fragments during an impeller burst.

It is a feature of the present invention to provide a containment system for containing fragments of a rotating impeller, resulting from a burst impeller within a housing, where the impeller comprises an annular impeller hub mounting impeller blades on the hub, the hub including an annular recessed portion; and containment means surrounding said impeller hub, said containment means including a catcher for catching a burst portion of said hub by engaging the annular recessed portion of said hub. More specifically, the containment means also includes a curved shroud surrounding the impeller blades.

It is a feature of the invention, from a broad aspect, to provide a containment system in which a portion of the impeller hub is formed with a concave recess to form a "snagger", and a portion of the shroud back plate downstream of the impeller hub is formed with a convex flange to form a "catcher". During an impeller burst, the impeller snagger is designed to engage the shroud back plate catcher. Because the center of gravity of the impeller is axially offset from the center of gravity of the blade tip shroud, a burst impeller fragment will tend to slide rearwards and tend to push the shroud forward. Since the groove on the impeller hub portion fits complementarily with the flange on the rear of the shroud, the impeller will be snagged by the flanged portion of the back plate shroud and be restrained from traveling any farther radially outward or longitudinally rearward. The hub is also constrained from moving more than a few inches from the point of burst.

It is another feature of the present invention, from a broad aspect, to provide a diffuser which is arranged to serve as a complementary containment structure for containing burst impeller fragments. The diffuser of the present invention is a circumferential ring arranged radially outward of the tip of the impeller blades. The diffuser is sized so that it will contain structure for any impeller fragments traveling in the tangentially outward direction between the curved shroud and the shroud back plate. The diffuser is also designed with a groove which will trap outward expansion of the curved shroud resulting from the high energy shock of the hub burst.

The invention can apply to any high speed rotating unit where safety and weight efficiencies are considerations, such as pumps, compressors, fans, etc.

DETAILED DESCRIPTION OF THE DRAWINGS

Figure 2:
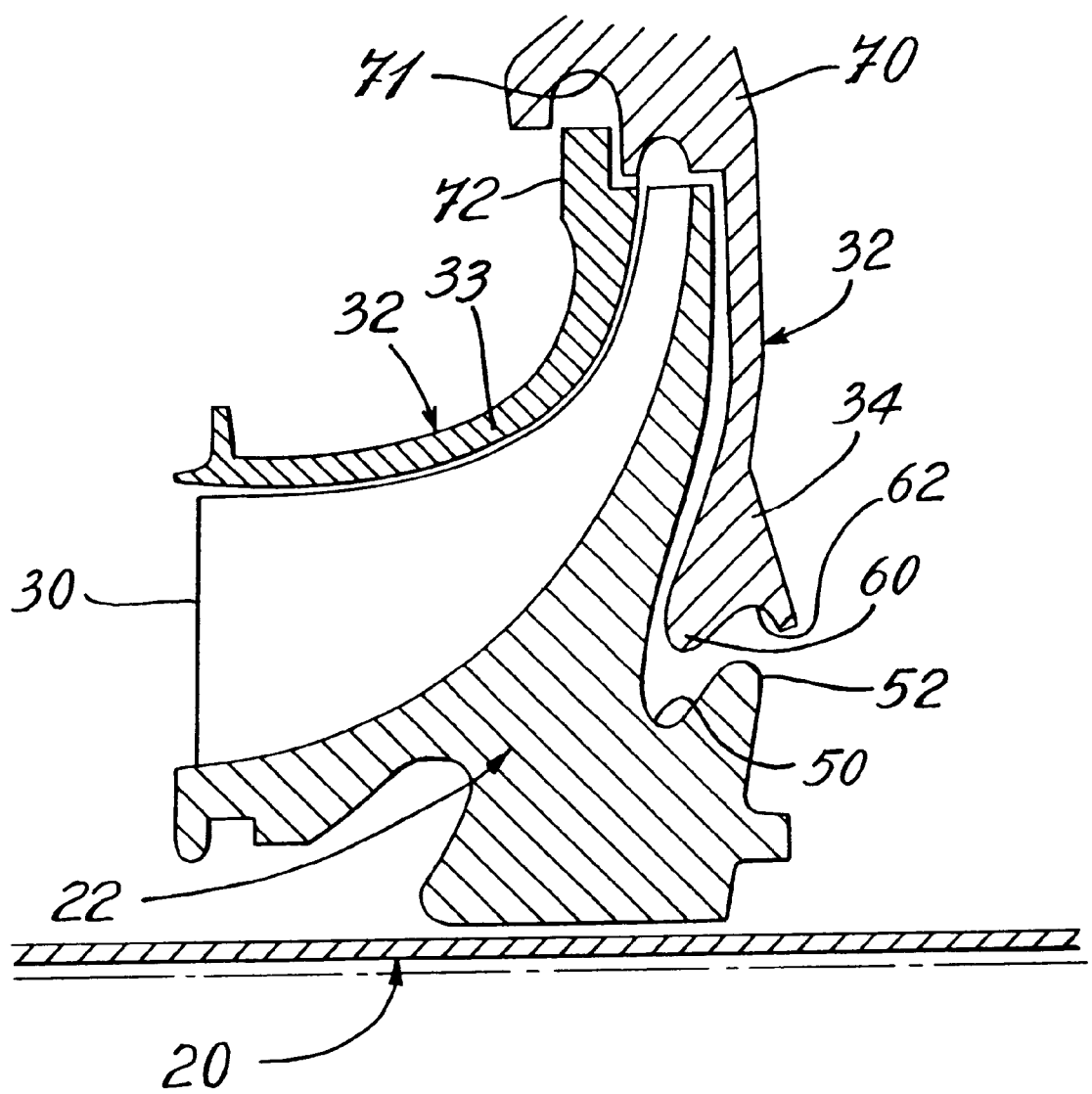

The preferred embodiments of the present invention will now be described with reference to the accompanying drawings, in which:

FIG. 1 shows a cross-sectional view of an auxiliary power unit including a containment system in accordance with a preferred embodiment of the present invention; and FIG. 2 shows an isolated cross-sectional view of a containment system in accordance with the preferred embodiment of the present invention.

DETAILED DESCRIPTION OF THE PREFERRED EMBODIMENTS

FIG. 1 generally discloses a cross-sectional view of a compressor section of an auxiliary power unit 10 as utilized in an aircraft. Auxiliary power units are generally utilized for driving the hydraulic, electric, and environmental control systems of an aircraft, and operate as a secondary power source separate from the primary propulsion engines of an aircraft. The The compressor section of the auxiliary power unit 10 of the present invention includes a housing 12 and a central drive shaft 20, which rotates about a longitudinal axis. As shown in FIG. 1, the compressor section includes a centrifugal impeller hub 22 and associated impeller blades 30, integrally connected with the impeller hubs. Surrounding the impeller is shroud 32. The longitudinally upstream portion of shroud 32 is a curved shroud 33 while the downstream portion includes shroud back plate 34. The inner portions of the shroud plate are designed to restrain the radial movement of the impeller hubs in the event of an impeller burst. They are also designed to control the eccentricity of the hub when one or more blades separate from the hub. The operation of these flanges in containing an impeller hub burst will be more fully described with respect to FIG. 2.

FIG. 2 shows the impeller assembly and containment system in accordance with the preferred embodiment of the present invention. The impeller assembly is composed of the impeller drive shaft 20, an annular impeller hub 22 attached to the drive shaft 20, and an annular series of impeller blades 30 integrally connected to the annular impeller hub 22. Surrounding the impeller assembly is an impeller shroud assembly generally shown at 32. The impeller shroud assembly 32 includes a curved impeller shroud portion 33 and a shroud back plate portion 34.

On the downstream side of the hub is a snagger flange 52 and an adjacent snagger groove 50. At the inner radius of the shroud back plate 34 is a catcher flange 60 and a catcher groove 62. These features are positioned in close proximity to each other both radially and axially so that during a containment event, they will intermesh. Thus, the groove 50 will slide into the flange 60, and the flange 52 will slide into the groove 62. These features are positioned at a general radius from the center line which is short relative to the overall impeller diameter. The cross-section areas of the flanges 52 and 60 and their respective support structures are designed to be sufficient and in keeping with their material strengths and the kinetic energy of the impeller. The snagger groove and snagger flange are shown to be generally concave and convex respectively. However, these structures are not limited to the exact shapes shown in cross-section in FIG. 2, and may take on other shapes, as would be understood by the person of ordinary skill in the art. For example, the respective flange and groove may be generally wedge shaped in cross-section.

At the upper end of the shroud back plate 34, an integral connection is made with the diffuser, generally shown at 70. The diffuser 70 is positioned radially outward of the impeller rim, and includes a groove 71, adjacent to the diffuser flow outlet 73 in FIG. 1. The groove 71 interfits with a bayonet flange, positioned on the outer portion of the shroud 32. The diffuser is supported in place by a connector 76, which is best shown in FIG. 1. A bolted flange 74 attaches the backup bayonet 72 to the connector 76.

The operation of the impeller containment system is as follows. In the event of an impeller hub failure, the impeller hub will tend to burst away from its associated drive shaft in a rearward and radially outward direction. During this motion, the snagger groove 50 and snagger flange 52 will become trapped by the complementary catcher groove 60 and catcher flange 62. Because of the complementary shapes of these structures, the burst impeller fragments will tend to become trapped and retained by the catcher flange groove.

The close proximity of the devices to the fragments is intended to immediately restrict their translational motion and to prolong their rotational motion. In so doing, the entire volume of the containment structure is utilized in the containment process, wherein in applications where the containment structure is remote from the respective hub, the translational impacts are on localized regions of the structure so that the structure is unevenly loaded and the material is less efficiently utilized.

Further protection is provided to the impeller and hub by the inner portion 71 of the diffuser, which includes a recessed groove portion at its inner end. The recessed groove portion 71 interacts with a bayonet flange 72 on the shroud 32 during the containment process. By this arrangement, any radially outward movement of the curved impeller shroud portion 33 of shroud 32 is restrained by the inner portion of the diffuser. This serves as a safety backup in the event that the shroud portion 33 also fails as a result of the high load forces experienced during an impeller burst.

Generally, the rotating compressors and turbine disks in gas turbine engines are limited by fatigue strength. Consequently, their burst speeds are considerably higher than operating speeds. For a containment test, it is necessary to burst the disk at its maximum operating speed, so the disk must be artificially weakened to achieve this.

When a disk bursts, the fragments retain virtually all the disk's original rotational energy. Each fragment now has two components of energy: a rotational component and a translational component. It is the translational component which can cause the most damage. In practice, a disk will break from a single failure origin, often from a fault in the bore where the stress is often the maximum. The exact fracture mode is unpredictable and can result in fragments of various sizes and shapes. The theoretical configuration which produces the maximum proportion of translational energy, and therefore the most dangerous configuration, is a failure which produces three equal sections. Therefore, this is the mode usually prescribed for testing, and it is known as a "tri-hub failure". It is usually achieved by cutting equally spaced slots in the hub to thereby weaken it to the point where it bursts at, or marginally above, the maximum operating speed. The tri-hub failure mode has become a standard for testing, but, in practice, disks do not necessarily break in this manner.

The containment system as illustrated in FIGS. 1 and 2 is preferably utilized in an auxiliary power unit engine, although the system as shown in this preferred embodiment may be utilized in other types of engines, pump, fans, etc., that include a centrifugal compressor or turbine. Other applications of this impeller containment system, such as in power generators used on land vehicles or in motors utilized in non-aerospace applications, are considered to be within the scope of the present invention. The preferred embodiment of the present invention is addressed to an impeller containment system and is not intended to be limited to specific applications on specific vehicles or specific types of engines. Other applications such as would be recognized by the person of ordinary skill in the art are considered to be within the scope of the present invention.

Having shown and described the preferred embodiments of the present invention, further adaptation of the containment system can be accomplished by appropriate modifications by one of ordinary skill in the art without departing from the scope of the present invention.

We claim:

1. A containment apparatus for containing fragments of a rotating centrifugal impeller resulting from a burst impeller within a housing, the centrifugal impeller including an annular impeller hub mounted for rotation about a longitudinal axis of rotation, the centrifugal impeller having a first outer radius from the axis of rotation, said impeller hub including an annular recessed portion defined in a downstream portion of the hub wherein the annular recessed portion has a second radius from the axis of rotation which is short relative to the first radius defining a radial groove, and containment means comprising an annular flange downstream of said impeller hub extending circumferentially adjacent said hub, said annular flange intermeshing with said annular groove for containing at least part of said hub by engaging said annular groove of the hub.

2. The containment apparatus as defined in claim 1, wherein said annular recessed portion of said hub extends circumferentially about said hub.

3. The containment apparatus as defined in claim 2, wherein said annular recessed portion of said hub defines a concave segment and a convex protrusion adjacent to said concave segment forming said groove and the annular flange has mating convex and concave segments.

4. The containment apparatus as defined in claim 1, wherein said containment means also includes an impeller shroud, said impeller shroud including an annular ring surrounding said centrifugal impeller at said first radius, said containment means including radial wall means connecting said annular ring to said annular flange.

5. The containment apparatus as defined in claim 3, wherein said convex and concave segments of said annular flange are adjacent to one another.

6. The containment apparatus as defined in claim 4, wherein the centrifugal impeller mounts an annular array of blades having blade tips and the shroud surrounds the blade tips.

7. The containment apparatus as defined in claim 6, wherein said shroud further includes a diffuser located adjacent a radial edge of said impeller blades.

8. The containment apparatus as defined in claim 1, wherein said centrifugal impeller mounts an annular array of blades having blade tips and said containment means includes secondary containment means located adjacent a radial edge portion of said blade tips.

9. The containment apparatus as defined in claim 8, wherein said secondary containment means comprises:

(i) a diffuser located adjacent a radial end portion of said blade tips, said diffuser including an inner surface portion with a cutaway portion along said inner surface portion;

(ii) a shroud having radially inwardly and radially outwardly extending portions relative to said longitudinal axis of rotation, said shroud having a bayonet flange on said radially outwardly extending portion.

10. The containment apparatus as defined in claim 9, wherein said bayonet flange is sized and configured to fit within said cutaway portion.

* * * * *